US006746623B2

(12) United States Patent
Slone et al.

(10) Patent No.: US 6,746,623 B2
(45) Date of Patent: Jun. 8, 2004

(54) ALKYL GLYCIDYL ETHER-CAPPED DIAMINE FOAM CONTROLLING AGENT

(75) Inventors: Caroline Sassano Slone, Quakertown, PA (US); Kevin Rodney Lassila, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 7 days.

(21) Appl. No.: 10/061,898

(22) Filed: Feb. 1, 2002

(65) Prior Publication Data

US 2003/0153631 A1 Aug. 14, 2003

(51) Int. Cl.$^7$ .................. B01D 19/04; C07C 213/00; A01N 25/04; C09D 11/00; C09K 3/00
(52) U.S. Cl. ................... 252/189; 564/475; 564/477; 524/244; 106/31.43; 106/31.97; 504/363; 423/228; 423/242.7; 516/129; 516/203
(58) Field of Search ................... 516/129, 203; 252/189; 564/475, 477; 524/244; 106/31.43, 31.97; 504/363

(56) References Cited

U.S. PATENT DOCUMENTS

| 3,931,430 A | 1/1976 | Tada et al. ................ 428/195 |
| 4,353,711 A | 10/1982 | Childs ........................... 44/63 |
| 4,650,000 A | 3/1987 | Andreasson et al. ........ 166/307 |
| 4,797,202 A | 1/1989 | Klimpel et al. ............. 209/166 |

FOREIGN PATENT DOCUMENTS

| CH | 313159 | 5/1956 |
| JP | 450119973 | 8/1990 |
| JP | 200010268 | 1/2000 |
| JP | 2001107083 | 4/2001 |

OTHER PUBLICATIONS

Japan Patent Office, Machine Translation of JP 2001–107083, http://www6.ipdl.jpo.go.jp/Tokujitu/PAJdetail.ipdl?N0000=60&N0120=01&N2001=2&N3001=2001–107083, copyright 1998, 2000 (Jan. 2003).*
Flores–Gallardo et al, "Epoxy ethers and ether amino alcohols", Journal of Organic Chemistry, vol. XII, 1947 (month unknown) pp. 831–833.*
Pollard et al, "Ether amino alcohols. II", Journal of Organic Chemistry, vol. XVII, 1952 (month unknown) pp. 1–3.*

European Search Report, Application No. 03001877.4–2113 dated Jul. 10, 2003.
R. Hofer, et al., *Ullmann's Encyclopedia of Industrial Chemistry*, vol. A11, 5$^{th}$ Ed., VCH Publishers, New York, 1988, month unavailable. p. 466–487.
V. E. Lewis, et al., *Foams: Fundamentals and Applications in the Petroleum Industry*, "Antifoaming and Defoaming in Refineries," Adv. Chem. Ser. 1994, month unavailable. 242, p 461–483, Refinery Process Chemicals, Nalco Chemical Co.
H. F. Mark, et al., *Encyclopedia of Polymer Science and Engineering*, 2$^{nd}$ Ed. vol. 2, John Wiley and Sons, New York, 1985, month unavailable. p. 58–72.
R. A. Reinhardt, et al., *Defoamer Selection in Waterborne Coatings*, Journal of Coatings Technology, 1998, month unavailable. 70, 157–160.
U. S. patent application S/N 09/909,555, filed Jul. 20, 2001, pp. 1–29.

* cited by examiner

Primary Examiner—Daniel S. Metzmaier
(74) Attorney, Agent, or Firm—Michael Leach

(57) ABSTRACT

The present invention pertains to a method for controlling the foaming of a waterborne composition or in an industrial process utilizing a waterborne composition by the incorporation of a foam controlling agent in an amount effective for controlling foam. The method comprises utilizing as the foam controlling agent an alkyl glycidyl ether-capped diamine compound of the formula:

$$\begin{array}{c} R \\ \diagdown \\ N-L-N \\ \diagup \\ R \end{array} \begin{array}{c} \diagup O-R' \\ \diagdown OH \\ R \end{array}$$

L is a linker group comprising a linear, branched, or cyclic alkyl group having from 2 to about 6 carbon atoms or an alkyl ether group having from about 4 to about 8 carbon atoms. R is independently selected from hydrogen or —$CH_2CHOHCH_2OR'$. R' is an alkyl group having from about 4 to about 22 carbon atoms. The compound generates an initial foam height at least 30% less than a 0.1 wt % aqueous solution of dioctyl sodium sulfosuccinate (DOSS), when added at 0.1 wt % to the aqueous DOSS solution. The present invention also pertains to an aqueous composition comprising the foam controlling agent.

27 Claims, No Drawings

ALKYL GLYCIDYL ETHER-CAPPED DIAMINE FOAM CONTROLLING AGENT

FIELD OF THE INVENTION

The invention relates to the use of alkyl glycidyl ether-capped diamines as foam controlling agents.

BACKGROUND OF THE INVENTION

Foam control or elimination in many waterborne applications and industrial processes is critical for obtaining optimal performance in application and high process efficiency [R. Höfer and coworkers, in B. Elvers, J. F. Rounsaville and G. Schulz, eds., *Ullmann's Encyclopedia of Industrial Chemistry*, Vol. A11, 5$^{th}$ Ed., VCH Publishers, New York, 1988, p. 466–488]. Foam problems can arise during production, processing and application. The importance of foam control and elimination is well-appreciated in applications such as waterborne coatings, inks, adhesives, lubricants, over-print varnishes and agricultural formulations and in industrial processes such as oil well drilling, completion and production, acid gas scrubbing, food processing, pulp and paper processing, fermentation, metal treatment, polymer and chemical synthesis, waste-water treatment and textile dying.

Undesirable foam can lead to inefficient mixing, poor productivity, reduced vessel capacity and equipment failure in many common industrial processes. For instance, foaming in refinery processes such as drilling, completion, production, distillation, extraction, gas and liquid scrubbing and other operations leads to a number of operating difficulties and significant economic consequences. In acid gas sweetening, or scrubbing, gases such as carbon dioxide and hydrogen sulfide are removed via scrubbing with an aqueous amine solution. Problematic foam can occur during both the scrubbing or regeneration steps in this process [V. E. Lewis and W. F. Minyard, *Antifoaming and Defoaming in Refineries in Foams: Fundamentals and Applications in the Petroleum Industry*, Adv. Chem. Ser., 1994, 242, p 461–483].

Defoamers and antifoams are additives that are used to reduce or eliminate problematic foam. An "antifoam" refers to a long-acting additive which prevents foam formation. A "defoamer" is an additive that yields rapid knock-down of existing foam thereby reducing or eliminating the foam. Herein, the term "foam control agent" is used to refer to additives that prevent and/or control foam since many applications and processes require both foam prevention and reduction or elimination.

Foam control agents act to prevent or eliminate foam by countering foam stabilizing forces and accelerating the rate of foam film drainage. Conventional foam control agents utilized in waterborne systems include silicones, dispersed hydrophobic solids, hydrocarbon fluids and polyalkyleneoxide polymers.

In many applications, foam control agents exhibit positive ancillary surface properties, such as wetting, dispersion, emulsification, solubilization, flow and leveling. For example, defoamers and antifoams that act as wetting agents will greatly reduce surface defects in coatings, inks, adhesives, over-print varnishes and agricultural formulations. In addition, such multi-functional materials will allow for the reduction or elimination of wetting agents in a waterborne composition, thereby reducing the total amount of additives. The ability of a material to act as a wetting agent in waterborne formulations is assessed by its ability to reduce the surface tension of water. Equilibrium surface tension performance is important when a system is at rest. However, the ability to reduce surface tension under dynamic conditions is of great importance in applications where high surface creation rates are utilized. Such applications include the spraying, rolling and brushing of coatings, adhesives or agricultural formulations, or high-speed gravure or ink jet printing. Dynamic surface tension is a fundamental quantity which provides a measure of the ability of a substance to reduce surface tension and provide wetting under high-speed application conditions. Also, the entrainment of air and the creation of foam is a problem under high-speed application conditions.

In addition to the development of multi-functional foam control agents, there is considerable interest in the industry in foam control agents with improved environmental characteristics. This increased environmental concern has been, in part, due to the poor environmental characteristics of currently used foam control agents and new environmental regulations. Such negative characteristics include poor biodegradation, a potential to bioaccumulate and high aquatic toxicity. Thus, not only is it desirable to obtain foam control agents which provide excellent foam prevention or elimination and dynamic wetting, but it is also highly desirable that such new materials are environmentally-friendly.

Highly effective foam control agents, which contain 100 percent active ingredient, have low color and low odor characteristics, can be used effectively under a wide range of operating conditions and do not adversely affect formulation performance or result in the disruption of downstream processes, are highly desirable. Moreover, there is a need in the industry for antifoaming and defoaming agents that exhibit positive ancillary surface properties, such as wetting, dispersion, emulsification, solubilization, flow and leveling.

Foam control agents are widely used in polymer production and processing since foam can lead to reduced production capacity, efficiency and equipment problems. In particular, severe foaming problems commonly result upon stripping unreacted monomers from the polymer product [H. F. Mark, N. M. Bikales, C. G. Overberger, G. Menges and J. I. Kroschwitz, Eds., *Encyclopedia of Polymer Science and Engineering*, 2$^{nd}$ Ed. Vol 2, John Wiley and Sons, New York, 1985, p. 59].

Selection of an appropriate foam control agent is key to the successful production, transfer and application of waterborne coatings, inks and adhesives. Defoamers are required in most waterborne coating formulations since they contain wetting agents, emulsifiers, dispersants and other additives which are capable of stabilizing foam [R. A. Reinhardt et. al., *Defoamer Selection in Waterborne Coatings*, Journal of Coatings Technology, 1998, 70, 157]. Problematic foam can lead to gloss and color loss, craters, pinholes, fish-eyes, orange peel, crawling, poor recoatability, poor color acceptance, adhesion loss and haze development.

U.S. Pat. No. 4,650,000 discloses that cationic quaternary ammonium salts of the adducts of diamines and $C_8$–$C_{18}$ alkyl glycidyl ethers are effective surfactants for the formation of microemulsions containing a hydrocarbon oil and aqueous acid solutions used to treat subterranean rock formations surrounding oil and gas wells.

U.S. Pat. No. 4,797,202 discloses N-(hydrocarbyl)-α,ω-alkanediamines as collectors for the recovery of minerals from mineral ores by froth flotation. In particular, the 1:1 adduct of ethylenediamine and butyl glycidyl ether was shown to be effective for copper recovery in the froth flotation of copper sulfide.

CH 313159 discloses a process for the preparation of stable dye and stripper baths containing positively charged amine additives. The baths contain 1:1 adducts of diamines and polyamines and $C_8$ and greater alkylglycidyl ethers and the corresponding alkylated amines formed by subsequent reactions with ethylene oxide, dimethyl sulfate, chloroacetic acid and other reagents.

JP 2001-107083 discloses 1:1 adducts of amines and alkyl glycidyl ethers for use in laundry detergent compositions.

JP 450119973 discloses adducts prepared by the reaction of amines and $C_6$ to $C_{16}$ alkyl glycidyl ethers as effective bactericidal surfactants. These compounds all contain carboxylate groups.

JP 200010268 discloses the use of adducts containing ethylenically unsaturated groups in photosensitive pastes. In particular, adducts of diamines and glycidyl methacrylate were used.

U.S. Pat. No. 3,931,430 discloses a method for using the reaction products of diamines and polyamines and $C_4$–$C_{16}$ glycidyl esters and ethers as desensitizers for pressure-sensitive recording sheets. These desensitizers must be soluble in the oil vehicle used to make non-aqueous inks for offset printing.

SUMMARY OF THE INVENTION

The present invention pertains to a method for controlling the foaming of a waterborne composition or in an industrial process utilizing a waterborne composition by the incorporation of a foam controlling agent in an amount effective for controlling foam. The method comprises utilizing as the foam controlling agent an alkyl glycidyl ether-capped diamine compound of the formula:

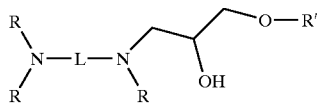

L is a linker group comprising a linear, branched, or cyclic alkyl group having from 2 to about 6 carbon atoms or an alkyl ether group having from about 4 to about 8 carbon atoms. R is independently selected from hydrogen or —$CH_2CHOHCH_2OR'$. R' is an alkyl group having from about 4 to about 22 carbon atoms. The compound generates an initial foam height at least 30% less than a 0.1 wt % aqueous solution of dioctyl sodium sulfosuccinate (DOSS), when added at 0.1 wt % to the aqueous DOSS solution.

Another embodiment of the invention comprises an alkyl glycidyl ether-capped diamine compound which comprise ethylenediamine capped, or adducted, with from 3 or 4 iso-butyl glycidyl ethers and di(aminopropyl)diethylene glycol capped with from 1 to 4 n-butyl glycidyl ethers.

The present invention also pertains to an aqueous composition comprising a foam controlling agent. The composition manifests greater foaming in the absence of the foam controlling agent. The foam controlling agent is an alkyl glycidyl ether-capped diamine present in an amount effective for controlling foam and has the formula:

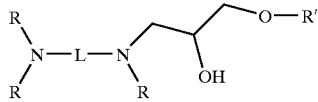

wherein L, R, and R' are as defined above.

DETAILED DESCRIPTION OF THE INVENTION

This invention relates to the use of the reaction products of diamines and alkyl glycidyl ethers for controlling, i.e. reducing, preventing or eliminating, foam in waterborne compositions and industrial processes that otherwise manifest foaming. There are significant advantages associated with the use of these alkyl glycidyl ether-capped diamines as foam control agents in water-based compositions and processes. These advantages include: foam control agents which have low odor and color; foam control agents which contain 100 percent active ingredient and thus do not require carrier fluids, solvents or other additives and exhibit improved shelf stability; waterborne coatings and inks which have low volatile organic content, thus making these formulations environmentally favorable; foam control agents capable of reducing the dynamic surface tension of waterborne compositions; waterborne coatings, inks, adhesives and agricultural formulations which may be applied to a variety of substrates with excellent wetting of substrate surfaces including contaminated and low energy surfaces; a reduction in coating or printing defects such as orange peel and flow/leveling deficiencies in comparison to conventional foam control agents; waterborne compositions capable of high speed application and processing; and industrial processes which have no foam or greatly reduced amounts of problematic foam with a reduction in negative effects in down-stream applications.

Not all alkyl glycidyl ether-capped diamines are capable of significantly reducing or eliminating foam. Therefore, the correct combination of diamine and alkyl glycidyl ether and an optimum degree of adduction is essential for the reduction and/or elimination of foam. Thus, suitable alkyl glycidyl ether-capped diamines are those that generate an initial foam height at least 30% less than a 0.1 wt % aqueous solution of dioctyl sodium sulfosuccinate (DOSS) when added at 0.1 wt % to the aqueous DOSS solution, as measured according to ASTM D 1173-53 at ambient temperature.

The terms "water-based", "waterborne", "aqueous" or "aqueous medium", for the purposes of this invention, mean a solvent or liquid dispersing medium which comprises water, preferably at least 90 wt %, and most preferably at least 95 wt %, water. Obviously, an all water medium is also included.

In another embodiment of the invention, the foam control agents may be utilized as wetting agents. It is desirable that an aqueous solution of the foam control agents exhibit ancillary wetting properties, as demonstrated by a dynamic surface tension $\leq 45$ dynes/cm at a concentration of $\leq 1$ wt % in water at 25° C. and 0.1 bubble/second according to the maximum-bubble pressure method. The maximum-bubble-pressure method of measuring surface tension is described in *Langmuir* 1986, 2, 428–432, which is incorporated by reference.

The excellent defoaming and antifoaming properties of these foam control agents suggest that these agents will be useful in applications and processes in which the reduction, prevention or knock-down of foam are important. Such applications include coatings, inks, adhesives, agricultural formulations, oil well production, acid gas scrubbing of a gas stream, for example, petroleum or natural gas, food processing, pulp and paper processing, fermentation, metal treatment, polymer and chemical synthesis, waste-water treatment and textile dying and finishing. As used in this specification and the appended claims, "oil well production"

is intended to comprise the drilling, completion, i.e., cementing, and/or pumping of the crude oil, as opposed to the stimulation of the oil well by treatment of formations surrounding the well. A preferred embodiment of the invention comprises a process for the removal of hydrogen sulfide and/or carbon dioxide from an acid gas-containing gas stream, such as natural gas, wherein the gas stream is contacted with an aqueous amine solution to adsorb the hydrogen sulfide, the aqueous amine solution is optionally regenerated, and an alkyl glycidyl ether-capped diamine according to the invention is added to control foam.

In addition, these materials can reduce the dynamic surface tension of waterborne compositions. Such attributes allow these materials to be used to control and eliminate foam with significantly less deleterious effects in application, making them extremely useful in coatings, inks and adhesives. Moreover, the wetting ability of these foam control agents allows these materials to be utilized in polymer production and processing without defects in downstream applications. In addition, such multi-functional materials will allow for the reduction or elimination of wetting agents in a waterborne composition, thereby reducing the total amount of additives.

From the data included in the examples, is evident that not all alkyl glycidyl ether-capped diamines are capable of reducing or eliminating foam and that certain adducts in fact add problematic foam to waterborne systems. Therefore, the correct combination of diamine and alkyl glycidyl ether group and an optimum degree of adduction as demonstrated in this work is essential for the reduction and/or elimination of foam. It is also unexpected that the foam control agents of this invention exhibit improved biodegradation in comparison to the corresponding adducts prepared from polyamines and alkyl glycidyl ethers.

In accord with the present invention, a method is provided for controlling the foaming of a waterborne composition or an industrial process by the incorporation of a foam controlling agent in an amount effective for controlling foam. The method comprises utilizing as the foam controlling agent an alkyl glycidyl ether-capped diamine compound of the formula:

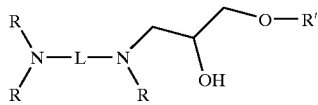

The alkyl glycidyl ether-capped diamine compounds of the present invention generate an initial foam height at least 30% less than a 0.1 wt % aqueous solution of dioctyl sodium sulfosuccinate (DOSS), when added at 0.1 wt % to the aqueous DOSS solution. Preferably, the compound generates an initial foam height 40%, and more preferably 50%, less than a 0.1 wt % aqueous solution of dioctyl sodium sulfosuccinate.

In the alkyl glycidyl ether-capped diamine compounds, L is a linker group comprising a linear, branched, or cyclic alkyl group having from 2 to about 6 carbon atoms or an alkyl ether group having from about 4 to about 8 carbon atoms. Preferably, L is an alkyl group having from about 2 to about 5 carbon atoms, more preferably from about 2 to about 4 carbon atoms, and most preferably from 2 to 3 carbon atoms. Preferably, L is an alkyl ether group having from about 4 to about 10 carbon atoms, more preferably from about 10 carbon atoms.

R is independently selected from hydrogen or —CH$_2$CHOHCH$_2$OR'. R' may be an alkyl group having from about 4 to about 22 carbon atoms. Preferably, R' is an alkyl group having from about 4 to about 20 carbon atoms, more preferably from about 4 to about 16 carbon atoms, and most preferably from about 4 to about 12 carbon atoms.

In a specific embodiment, L is —CH$_2$CH$_2$—, R is independently selected from hydrogen or —CH$_2$CHOHCHO—CH$_2$CH$_2$CH$_2$CH$_3$, i.e., R' is a butyl group. In another specific embodiment, L is —CH$_2$CH$_2$—, R is independently selected from hydrogen or —CH$_2$CHOHCHO—CH$_2$CH (CH$_3$)$_2$, i.e., R' is an iso-butyl group. Preferably, there are from 2 to 4 capping groups on the amine, i.e., the ratio of amine to alkyl glycidyl ether in the epoxide opening reaction is from about 1:2 to about 1:4.

In another embodiment, the present invention is directed to an aqueous composition comprising a foam controlling agent, which composition manifests greater foaming in the absence of the foam controlling agent. The foam controlling agent is an alkyl glycidyl ether-capped diamine present in an amount effective for controlling foam and has the formula:

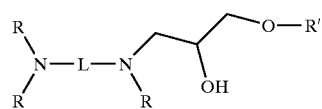

wherein L, R, and R' are as defined above.

In a specific embodiment, the waterborne composition is a protective or decorative coating; an ink composition; an adhesive composition; an overprint varnish; a radiation cured coating, ink, overprint varnish, or adhesive composition; an agricultural composition; or an acid gas scrubbing composition. In another specific embodiment, the industrial process is oil well production, acid gas scrubbing, food processing, pulp or paper processing, fermentation, metal treatment, polymer or chemical synthesis, waste-water treatment, or textile dyeing or finishing.

The alkyl glycidyl ether-capped diamines of the invention may be prepared by the reaction of a diamine with one or more alkyl glycidyl ethers in an epoxide ring opening reaction. The reaction may be performed with or without solvent. Preferably, the alkyl glycidyl ether is added to the amine reagent and the reaction temperature is maintained between 60–120° C. The product may be used with or without purification. The product obtained from the reaction of a diamine and an alkyl glycidyl ether is a mixture since the hydroxy group generated via the epoxide ring opening reaction may also react with an alkyl glycidyl ether. The reaction illustrated below shows one of the more common adducts contained in the product mixture:

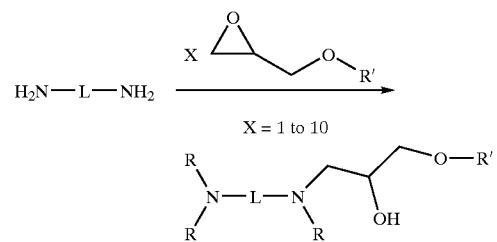

where L, R and R' are as defined above.

All alkyl glycidyl ethers or mixtures of alkyl glycidyl ethers containing the requisite number of carbon atoms (C$_4$ to C$_{22}$) may be utilized for the preparation of the capped-diamine foam control agents of this invention. Alkyl groups which are suitable should have sufficient carbon atoms to confer surface activity, i,e., an ability to act as a foam control agent and reduce the surface tension of water.

The alkyl groups in the alkyl glycidyl ether-capped diamines of this invention may be the same or different. Examples of suitable linear or branched alkyl glycidyl ethers (CH$_2$(O)CH—CH$_2$OR') include butyl glycidyl ether, isobutyl glycidyl ether, pentyl glycidyl ether, iso-amyl glycidyl ether, hexyl glycidyl ether, 2-ethylhexyl glycidyl ether, octyl glycidyl ether, decyl glycidyl ether, lauryl glycidyl ether, myristyl glycidyl ether, cetyl glycidyl ether, and the like.

Examples of suitable diamines (H$_2$N—L—NH$_2$) include those with linear, branched and cyclic hydrocarbon spacers, such as ethylenediamine, propylenediamine, butanediamine, pentanediamine, hexamethylenediamine, 2-methyl-1,5-pentanediamine and bis (p-amino-cyclohexyl) methane. In addition, suitable diamines may contain ether moieties in the spacer group. Optimal performance for a specific application can be achieved be appropriate manipulation of the starting amine and alkyl glycidyl ether and the degree of adduction.

The amount of alkyl glycidyl ether-capped diamine that is effective to reduce or eliminate the foam of the water-based, organic compound-containing composition is an amount effective for controlling foam. In general, this amount may range from about 0.001 to about 20 g/l 100 mL, preferably from about 0.01 to about 10 g/l 100 mL, of the aqueous composition. Naturally, the most effective amount will depend on the application and the efficiency of the foam control agent.

The alkyl glycidyl ether-capped diamines are suitable for use in an aqueous composition comprising in water an inorganic or organic pigment, a polymerizable monomer, such as addition, condensation and vinyl monomers, an oligomeric resin, a polymeric resin, a herbicide, a fungicide, an insecticide, or a plant growth modifying agent.

In a specific embodiment, the composition comprises in water an inorganic compound which is a mineral ore or a pigment or an organic compound which is a pigment, a polymerizable monomer, such as an addition, condensation or vinyl monomer, an oligomeric resin, a polymeric resin, a herbicide, an insecticide, a fungicide, or a plant growth modifying agent.

The alkyl glycidyl ether-capped diamines of the present invention may be employed along with conventional additives in water-based protective or decorative organic coatings, inks, adhesives, fountain solutions, agricultural, varnish, and acid gas sweetening compositions.

A typical water-based coating formulation to which the foam control agents of the invention may be added would comprise the following components in an aqueous medium at 30 to 80% "solids", i.e., listed ingredients:

(a) 0 to 50 wt % of a pigment dispersant/grind resin;
(b) 0 to 80 wt % of coloring pigments/extender pigments/anti-corrosive pigments/other pigment types;
(c) 5 to 99.9 wt % of water-borne/water-dispersible/water-soluble resins;
(d) 0 to 30 wt % of slip additives/antimicrobials/processing aids;
(e) 0 to 20 wt % of coalescing or other solvents;
(f) 0.01 to 10 wt % of surfactant/wetting agent/flow and leveling agents; and
(g) 0.01 to 5 wt % of an alkyl glycidyl ether-capped diamine foam control agent.

A typical water-based ink composition to which the foam control agent of the invention may be added would comprise the following components in an aqueous medium at 20 to 60% "solids", i.e., listed ingredients:

(a) 1 to 50 wt % of a pigment;
(b) 0 to 50 wt % of a pigment dispersant/grind resin;
(c) 0 to 50 wt % of a clay base in appropriate resin solution vehicle;
(d) 5 to 99.9 wt % of water-borne/water-dispersible/water-soluble resins;
(e) 0 to 30 wt % of coalescing solvents;
(f) 0.01 to 10 wt % of a surfactant/wetting agent;
(g) 0.01 to 10 wt % of processing aids/solubilizing agents;
(h) 0.01 to 5 wt % of an alkyl glycidyl ether-capped diamine foam control agent.

A typical water-based agricultural composition to which the foam control agent of the invention may be added would comprise the following components in an aqueous medium at 0.01 to 80% "solids", i.e., listed ingredients:

(a) 0.1–50 wt % of a pesticide or plant growth modifying agent;
(b) 0 to 5 wt % of a dye;
(c) 0 to 20 wt % of a thickener/stabilizer/co-surfactant/gel/Inhibitor;
(d) 0 to 25 wt % of an antifreeze;
(e) 0.01 to 50 wt % of a surfactant/wetting agent;
(f) 0.01 to 10 wt % of an alkyl glycidyl ether-capped diamine foam control agent.

A typical fountain solution composition for planographic printing to which the foam control agent of the invention may be added would comprise the following components:

(a) 0.05 to 10 wt % of a film formable, water soluble macromolecule;
(b) 1 to 25 wt % of an alcohol, glycol, or polyol with 2–12 carbon atoms;
(c) 0.01 to 20 wt % of a water soluble organic acid, inorganic acid, or a salt thereof;
(d) 30 to 70 wt % of water;
(e) 0.01 to 5 wt % of a wetting agent; and
(f) 0.01 to 5 wt % of an alkyl glycidyl ether-capped diamine foam control agent.

A typical pressure sensitive adhesive to which the foam control agent of the invention may be added would comprise the following components:

(a) 50 to 99 wt % of an acrylic copolymer emulsion or SBR/natural rubber latex;
(b) 0 to 50 wt % of a tackifier dispersion;
(c) 0 to 5 wt % of a rheology modifier;
(d) 0 to 10 wt % of water;
(e) 0.1 to 5 wt % of a wetting agent;
(f) 0.1 to 5 wt % of an alkyl glycidyl ether-capped diamine foam control agent.

A typical pressure overprint varnish to which the foam control agent of the invention may be added would comprise the following components:

(a) 20 to 80 wt %of a water-borne/water dispersible resin;
(b) 0 to 20 wt % of a wax;
(c) 2 to 50 wt % of water;
(d) 0 to 20 wt % of a biocide/optical brightener/crosslinker/scuff and water resistant additive;
(e) 0 to 20 wt % of a co-solvent;
(f) 0.01 to 5 wt % of a wetting agent;
(g) 0.1 to 5 wt % of an alkyl glycidyl ether-capped diamine foam control agent.

A typical acid gas scrubbing composition to which the foam control agent of the invention may be added would comprise in water 10 to 70 wt % of at least one amine, preferably an alkanolamine, as is well known in the art and 1 to 500 ppm of an alkyl glycidyl ether-capped diamine foam control agent.

The present invention can be further illustrated by the following examples of preferred embodiments thereof, although it will be understood that these examples are included merely for purposes of illustration and are not intended to limit the scope of the invention unless otherwise specifically indicated.

EXAMPLES

Examples 1–28 illustrate the synthesis of various foam control agents consistent with those claimed in this invention. All materials were synthesized and characterized via either Gas Chromatography (GC), Matrix-Assisted Laser Desorption/Ionization (MALDI) or Nuclear Magnetic Resonance (NMR) spectroscopy. Ethylenediamine (EDA) was purchased as 99% pure from Aldrich Chemical Co. and used as received. Hexamethylenediamine was purchased as 99.5% pure from ACROS Organics and 2-methyl-1,5-pentanediamine (MPD) was obtained as 99% pure from E. I. DuPont De Nemours and Co., Inc. under the name Dytek® A diamine. Both amines were used as received. The di(aminopropyl)diethylene glycol (DAPDEG) and bis (p-aminocyclohexyl) methane (PACM) used are sold by Air Products and Chemicals, Inc. under the name Ancamine™ 1922A and PACM20. Two of the alkylglycidyl ether reagents used are sold by Air Products and Chemicals, Inc. under the names Epodil®741 HP and Epodil®746 and contain 98+% n-butyl glycidyl ether and 70–73% 2-ethylhexyl glycidyl ether, respectively. The iso-butyl glycidyl ether was purchased as 97% pure from Aldrich Chemical Co. and used as received. For the purposes of this invention, these reagents will be referred to as n-butyl glycidyl ether (BGE), 2-ethylhexyl glycidyl ether (EHGE) and iso-butyl glycidyl ether (IBGE).

Examples 1–4

The 1:1, 1:2, 1:3 and 1:4 adducts of ethylenediamine (EDA) and iso-butyl glycidyl ether (IBGE) were prepared by the reaction of neat amine with the appropriate number of equivalents of iso-butyl glycidyl ether. To a 3-necked round-bottomed flask equipped with an addition funnel, a reflux condenser, a thermocouple and a magnetic stir bar were added ethylenediamine (61.10 g). The amine was heated to 80° C. under nitrogen. At this point, the heat was turned off and the iso-butyl glycidyl ether (164.17 g) was added to the amine at a rate which allowed for the reaction temperature to be maintained between 90–122° C. After the addition of 1 equivalent of iso-butyl glycidyl ether the reaction was heated at 100° C. for 20 min and then a sample was removed (Example 1, 10.37 g, 1:1 EDA/IBGE adduct, light yellow paste). To the reaction mixture were subsequently added 2–4 equivalents of isobutyl glycidyl ether at 88–116° C. After the addition of each equivalent, the reaction was heated to 100° C. for at least 5 min. The following samples were sequentially removed from the reaction pot; Example 2 (9.96 g, 1:2 EDA/IBGE, light yellow paste), Example 3 (10.35 g, 1:3 EDA/IBGE, light yellow paste) and Example 4 (155.45 g, 1:4 DETA/BGE, light yellow solid). These samples were used without further purification.

Examples 5–8

The 1:1, 1:2, 1:3 and 1:4 adducts of ethylenediamine and n-butyl glycidyl ether (BGE) were prepared by the reaction of neat amine (120.9 g) with the appropriate number of equivalents of n-butyl glycidyl ether using a procedure similar to that in Examples 1–4. The adducts formed were Example 5 (130.1 g, 1:1 EDA/BGE, light yellow solid), Example 6 (141.9 g, 1:2 EDA/BGE, very light yellow slurry), Example 7 (142.7 g, 1:3 EDA/BGE, very light yellow slurry) and Example 8 (433.4 g, 1:4 EDA/BGE, light yellow liquid). These materials were used without further purification.

Examples 9–12

The 1:1, 1:2, 1:3, and 1:4 adducts of ethylenediamine and 2-ethylhexyl glycidyl ether (EHGE) were prepared by the reaction of neat amine (60.0 g) with the appropriate number of equivalents of 2-ethylhexyl glycidyl ether using a procedure similar to that in Examples 1–4. The adducts formed were Example 9 (100 g, 1:1 EDA/EHGE, yellow liquid), Example 10 (100 g, 1:2 EDA/EHGE, yellow liquid), Example 11 (100 g, 1:3 EDA/EHGE, yellow liquid) and Example 12 (270.7 g, 1:4 EDA/EHGE yellow liquid). These materials were used without further purification.

Examples 13–16

The 1:1, 1:2, 1:3 and 1:4 adducts of hexamethylenediamine (HDA) and n-butyl glycidyl ether were prepared by the reaction of neat amine (150 g) with the appropriate number of equivalents of n-butyl glycidyl ether using a procedure similar to that in Examples 1–4. The adducts formed were Example 13 (100 g, 1:1 HDA/BGE, light yellow solid), Example 14 (100 g, 1:2 HDA/BGE, light yellow paste), Example 15 (100 g, 1:3 HDA/BGE, light yellow solid) and Example 16 (259.6 g, 1:4 HDA/BGE, viscous light yellow liquid). The resulting adducts were used without further purification.

Examples 17–20

The 1:1, 1:2, 1:3 and 1:4 adducts of 2-methyl-1,5-pentanediamine (MPD) and n-butyl glycidyl ether were prepared by the reaction of neat amine (150 g) with the appropriate number of equivalents of n-butyl glycidyl ether using a procedure similar to that in Examples 1–4. The adducts formed were Example 17 (100 g, 1:1 MPD/BGE, golden liquid), Example 18 (100 g, 1:2 MPD/BGE, golden liquid), Example 19 (100 g, 1:3 MPD/BGE, golden liquid) and Example 20 (100 g, 1:4 MPD/BGE, golden liquid). The resulting adducts were used without further purification.

Examples 21–24

The 1:1, 1:2, 1:3 and 1:4 adducts of bis (p-aminocyclohexyl)methane (PACM) and n-butyl glycidyl ether were prepared by the reaction of neat amine (200 g) with the appropriate number of equivalents of n-butyl glycidyl ether using a procedure similar to that in Examples 1–4. The adducts formed were Example 21 (100 g, 1:1 PACM/BGE, very viscous light yellow liquid), Example 22 (100 g, 1:2 PACM/BGE, very viscous light yellow liquid), Example 23 (100 g, 1:3 PACM/BGE, very viscous light yellow liquid) and Example 24 (189.34 g, 1:4 PACM/BGE, very viscous light yellow liquid). The resulting adducts were used without further purification.

Examples 25–28

The 1:1, 1:2, 1:3 and 1:4 adducts of di(aminopropyl) diethylene glycol (DAPDEG) and n-butyl glycidyl ether were prepared by the reaction of neat amine (50 g) with the appropriate number of equivalents of n-butyl glycidyl ether using a procedure similar to that in Examples 1–4. The adducts formed were Example 25 (15.0 g, 1:1 DAPDEG/BGE, light yellow paste), Example 26 (15.0 g, 1:2 DAPDEG/BGE, light yellow paste), Example 27 (15.0 g, 1:3 DAPDEG/BGE, light yellow paste) and Example 28 (94.6 g, 1:4 DAPDEG/BGE, light yellow liquid). The resulting adducts were used without further purification.

Examples 29–57

Dioctyl sodium sulfosuccinate (DOSS) is a commonly used surfactant in waterborne compositions. DOSS is capable of forming stable foams when dissolved in water. The foam control characteristics of various foam control agents may be assessed by measuring the foam generated by a 0.1 wt % aqueous solution of DOSS and comparing this to the foam generated after the addition of foam control agent to a 0.1 wt % DOSS solution. The DOSS utilized in these measurements was an Aerosol OT 75% surfactant obtained from Cytec Industries. The foaming and foam stability of DOSS were measured using a procedure based upon ASTM D 1173–53 at ambient temperature, typically 23° C. The foam control properties of the foam control agents prepared in Examples 1–28 were measured by adding 0.1 wt % foam control agent to 0.1 wt % DOSS in water, separating the resulting solution from any insoluble oil and using the aforementioned procedure to assess the reduction in foamability and foam stability.

In these tests, an aqueous solution of DOSS or the filtrate from the DOSS/foam control agent mixture is added from an elevated foam pipette to a foam receiver containing the same solution. The foam height is measured at the completion of the addition ("Initial Foam Height") and the time required for the foam to dissipate at the air-liquid interface ("Time to 0 Foam") is recorded. This test provides a comparison between the foaming characteristics of various aqueous compositions. The results for the foam control agents prepared in Examples 1–28 are reported in Table 1 along with comparative data for a 0.1 wt % solution of DOSS with no added foam control agent (Example 29).

The data in Table 1 show that many alkyl glycidyl ether-capped diamines behave as foam control agents when added to an aqueous solution of a foamy surfactant, such as DOSS. The foam control behavior, however, is highly dependent on the combination of alkyl glycidyl ether and diamine. In fact, Example 34 actually shows an increase in foaming when added to the 0.1 wt % aqueous DOSS solution. Also, other alkyl glycidyl ether/diamine combinations demonstrate very little effect on the foaming of the DOSS solution. Therefore, it was unexpected that certain adducts of alkyl glycidyl ethers and diamines would yield materials which were particularly effective foam control agents. In the defoaming test described herein, those materials which exhibited an ability to reduce the initial foam height of DOSS by at least 30%, preferably 40%, more preferably 50%, or greater, or those which were able to completely dissipate foam by 10 minutes were the best performing foam control agents. However, the efficiency of a particular foam control agent is generally system-specific. Therefore, the optimum choice of a foam control agent for a specific application will depend on the choice of diamine and alkyl glycidyl ether and the degree of diamine adduction.

TABLE 1

Foam Test Data of DOSS Solutions

| Example | Foam control Agent | Initial foam height (cm) | Foam height after 1 min | Foam height after 10 min |
|---|---|---|---|---|
| 29 | DOSS only control | 3.0 | 2.7 | 2.5 |
| 30 | EDA/1 IBGE | 1.5 | 1.0 | 0.3 |
| 31 | EDA/2 IBGE | 1.2 | 1.0 | 0.3 |
| 32 | EDA/3 IBGE | 0.9 | 0.8 | 0.7 |
| 33 | EDA/4 IBGE | 2.0 | 1.5 | 1.2 |
| 34 | EDA/1 BGE | 3.5 | 2.0 | 1.4 |
| 35 | EDA/2 BGE | 2.4 | 1.5 | 1.0 |
| 36 | EDA/3 BGE | 2.0 | 1.4 | 1.2 |
| 37 | EDA/4 BGE | 1.9 | 1.3 | 1.2 |
| 38 | EDA/1 EHGE | 1.5 | 0.2 | 0 |
| 39 | EDA/2 EHGE | 1.7 | 1.0 | 0 |
| 40 | EDA/3 EHGE | 2.1 | 1.5 | 1.2 |
| 41 | EDA/4 EHGE | 3.0 | 2.5 | 2.1 |
| 42 | HDA/1 BGE | 1.4 | 0.4 | 0 |
| 43 | HDA/2 BGE | 1.2 | 0 | 0 |
| 44 | HDA/3 BGE | 1.2 | 0 | 0 |
| 45 | HDA/4 BGE | 1.5 | 1.3 | 1.2 |
| 46 | MPD/1 BGE | 2.3 | 0.8 | 0 |
| 47 | MPD/2 BGE | 1.9 | 0.5 | 0 |
| 48 | MPD/3 BGE | 1.9 | 0.9 | 0 |
| 49 | MPD/4 BGE | 2.5 | 1.5 | 0.5 |
| 50 | PACM/1 BGE | 2.3 | 0 | 0 |
| 51 | PACM/2 BGE | 2.3 | 1.3 | 0.8 |
| 52 | PACM/3 BGE | 2.5 | 2.8 | 1.5 |
| 53 | PACM/4 BGE | 2.7 | 2.1 | 1.8 |
| 54 | DAPDEG/1 BGE | 1.7 | 0.8 | 0.2 |
| 55 | DAPDEG/2 BGE | 1.8 | 0.8 | 0.1 |
| 56 | DAPDEG/3 BGE | 1.9 | 0.9 | 0.1 |
| 57 | DAPDEG/4 BGE | 2.3 | 1.2 | 0.2 |

Examples 57–85

The foam control agents of this invention are also capable of acting as wetting agents in waterborne systems. The wetting ability of the foam control agents prepared in Examples 1–28 was determined by assessing their ability to reduce the dynamic surface tension of water. The materials in Examples 1–28 were added to distilled water at 0.1–5.0 wt % to give completely soluble aqueous solutions or saturated aqueous mixtures. Dynamic surface tension data were obtained for the soluble portion of these samples using the maximum bubble pressure method at bubble rates from 0.1 bubbles/sec (b/s) to 20 b/s. These data provide information about the performance of the foam control agents as wetting agents from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

The relative efficiency of surface tension reduction can be obtained by comparing surface tension reduction of solutions containing the same amount of different surfactants. Such data are given for 0.1 wt % solutions of the foam control agents at 0.1, 1, 6 and 20 bubbles/second (b/s). The limiting surface tensions at 0.1, 1, 6 and 20 b/s represent the lowest surface tensions in water which can be achieved at the given surface creation rates for a given surfactant regardless of the amount of surfactant used and is used to evaluate the effectiveness of a surfactant. In most cases the limiting surface tension was taken at 1.0 wt % since the foam control agent was insoluble at this concentration. In the case where the foam control agent was soluble at 1.0 wt %, the limiting surface tension was taken at 5.0 wt % (where the samples were insoluble). These values give information about the relative ability to a surfactant to reduce surface defects under near-equilibrium conditions (0.1 b/s) through very dynamic conditions (20 b/s). Lower surface tensions would allow the elimination of defects upon application of a formulation onto lower energy surfaces. Table 2 shows the dynamic surface tension data of aqueous solutions of foam control agents.

The data in Examples 58–85 in Table 2 illustrate that various foam control agents have the ability to reduce the surface tension of an aqueous composition and that in many cases low surface tension can be maintained even under conditions in which surface is created at a rapid rate. In particular, those surfactants which are capable of reducing the dynamic surface tension of water to 45 dyne/cm or less at 25° C. at 1.0 b/s are preferred for use in applications in which wetting is important and those which yield dynamic surface tension values of less than 45 dyne/cm at 0.1 wt % and 0.1 b/s are most preferred. Such applications include the spraying, rolling or brushing of coatings, inks, adhesives and agricultural formulations onto surfaces.

Thus, the foam control agents of this invention may be utilized as multi-functional additives. Such a combination of attributes allow for these materials to be used to control and eliminate foam with significantly less deleterious effects in application, making them extremely useful in coatings, inks and adhesives. Moreover, the wetting ability of these foam control agents will allow these materials to be utilized in polymer production and processing without the appearance of negative effects in downstream applications. In addition, these foam control agents may allow for the reduction in the total amount of additives used in application or as process aids since they may replace wetting agents.

TABLE 2

Dynamic Surface Tension Data of Aqueous Solutions of Foam Control Agents

| Ex | | γ at 0.1 wt % | | | | γ limiting[a] | | | |
|---|---|---|---|---|---|---|---|---|---|
| | | 0.1 b/s | 1 b/s | 6 b/s | 20 b/s | 0.1 b/s | 1 b/s | 6 b/s | 20 b/s |
| 58 | EDA/1 IBGE | 47.9 | 51.9 | 53.8 | 59.6 | 29.7 | 30.1 | 30.5 | 31.7[b] |
| 59 | EDA/2 IBGE | 39.1 | 42.3 | 44.2 | 49.9 | 31.7 | 32.0 | 33.4 | 34.6 |
| 60 | EDA/3 IBGE | 38.9 | 42.5 | 44.1 | 50.3 | 33.3 | 34.3 | 35.0 | 35.6 |
| 61 | EDA/4 IBGE | 37.6 | 41.7 | 51.4 | 65.5 | 34.8 | 36.7 | 40.3 | 49.4 |
| 62 | EDA/1 BGE | 46.1 | 49.4 | 53.4 | 59.9 | 36.7 | 37.2 | 38.1 | 39.8 |
| 63 | EDA/2 BGE | 38.8 | 40.9 | 44.3 | 50.9 | 35.9 | 36.2 | 36.9 | 38.1 |
| 64 | EDA/3 BGE | 37.6 | 39.6 | 43.2 | 51.3 | 34.9 | 35.6 | 36.5 | 38.3 |
| 65 | EDA/4 BGE | 36.7 | 38.9 | 44.4 | 58.4 | 35.9 | 37.0 | 39.2 | 43.0 |
| 66 | EDA/1 EHGE | 28.6 | 37.3 | 54.7 | 63.3 | 27.4 | 28.3 | 30.6 | 32.5 |
| 67 | EDA/2 EHGE | 36.6 | 56.2 | 69.3 | 71.5 | 31.1 | 33.3 | 42.5 | 48.2 |
| 68 | EDA/3 EHGE | 45.3 | 58.7 | 70.5 | 70.9 | 33.5 | 36.0 | 47.1 | 48.7 |
| 69 | EDA/4 EHGE | 60.7 | 67.9 | 71.0 | 71.7 | 44.4 | 50.6 | 51.0 | 52.1 |
| 70 | HDA/1 BGE | 42.3 | 44.8 | 47.9 | 52.6 | 39.3 | 40.1 | 41.1 | 42.9 |
| 71 | HDA/2 BGE | 40.1 | 42.0 | 44.8 | 49.8 | 39.3 | 41.3 | 41.3 | 43.4 |
| 72 | HDA/3 BGE | 40.3 | 43.1 | 47.5 | 55.4 | 37.9 | 39.1 | 40.7 | 44.4 |
| 73 | HDA/4 BGE | 42.9 | 55.9 | 67.6 | 70.8 | 37.3 | 39.0 | 40.8 | 41.9 |
| 74 | MPD/1 BGE | 41.9 | 44.3 | 47.5 | 52.4 | 35.9 | 36.6 | 37.5 | 39.2 |
| 75 | MPD/2 BGE | 40.2 | 42.3 | 45.3 | 50.6 | 36.0 | 36.6 | 37.7 | 37.9 |
| 76 | MPD/3 BGE | 40.0 | 42.9 | 47.4 | 56.2 | 37.9 | 39.0 | 41.4 | 41.1 |
| 77 | MPD/4 BGE | 42.8 | 55.7 | 67.5 | 67.7 | 35.3 | 36.4 | 38.9 | 41.5 |
| 78 | PACM/1 BGE | 44.7 | 47.0 | 50.3 | 55.2 | 43.5 | 44.5 | 46.2 | 48.7 |
| 79 | PACM/2 BGE | 45.8 | 50.8 | 58.6 | 66.3 | 45.2 | 48.1 | 52.5 | 58.7 |
| 80 | PACM/3 BGE | 50.2 | 59.2 | 69.1 | 71.8 | 47.9 | 54.0 | 63.5 | 65.8 |
| 81 | PACM/4 BGE | 70.6 | 71.8 | 72.0 | 72.4 | 58.5 | 68.5 | 70.5 | 71.0 |
| 82 | DAPDEG/1 BGE | 50.3 | 54.1 | 56.7 | 61.0 | 36.4 | 40.3 | 42.9 | 45.7 |
| 83 | DAPDEG/2 BGE | 42.1 | 44.9 | 48.5 | 53.8 | 33.2 | 34.0 | 35.3 | 37.8 |
| 84 | DAPDEG/3 BGE | 38.0 | 39.4 | 42.1 | 47.6 | 33.5 | 38.7 | 34.3 | 36.1 |
| 85 | DAPDEG/4 BGE | 37.4 | 38.9 | 42.0 | 50.7 | 34.2 | 34.5 | 35.5 | 39.1 |

[a] γ limiting is reported as the surface tension of a saturated solution made using 1.0 wt % foam control agent in water unless otherwise noted.
[b] γ limiting is reported as the surface tension of a saturated solution made using 5.0 wt % foam control agent since 1.0 wt % of this foam control agent was completely soluble in water.

Examples 86–98

The ultimate biodegradability of the foam control agents in Examples 5–8 and 13–16 and corresponding adducts prepared from a polyamine (diethylenetriamine, DETA) is illustrated in Table 3. Assessment of the biodegradability of these compounds was made using the Carbonaceous Biological Oxygen Demand (CBOD) test at 28 days. The test samples were weighed out and solubilized in Milli-Q water with a target total organic carbon (TOC) content of 100 mg/L. The chemical oxygen demand (COD) was measured on these solutions as a measure of the complete oxidation or Ultimate Biological Oxygen Demand (UBOD). These samples were run in duplicate in 28 day CBOD tests using a biomass seed from an Easton Pa. wastewater treatment plant which was not acclimatized to the samples. The results from the CBOD tests were divided by the COD results for each respective solution and multiplied by 100 to calculate the percent biodegradation. A glucose/glutamic acid solution which is highly biodegradable, was run as a positive control to check biomass health. This is the preferred control for BOD tests as listed in the Standard Methods.

TABLE 3

Biodegradation Data

| | | Percent Biodegradation at 28 days | |
|---|---|---|---|
| Example | | Trial 1 | Trial 2 |
| 86 | EDA/1 BGE | 0 | 66 |
| 87 | EDA/2 BGE | 100 | 69 |
| 88 | EDA/3 BGE | 0 | 50 |
| 89 | EDA/4 BGE | 0 | 67 |
| 90 | HDA/1 BGE | 65 | 38 |
| 91 | HDA/2 BGE | 8 | 42 |
| 92 | HDA/3 BGE | 0 | 100 |
| 93 | HDA/4 BGE | 0 | 0 |
| 94 | DETA/1 BGE | 0 | 0 |
| 95 | DETA/2 BGE | 0 | 0 |
| 96 | DETA/3 BGE | 0 | 0 |
| 97 | DETA/4 BGE | 0 | 0 |
| 98 | DETA/5 BGE | 0 | 0 |

The data in Table 3 surprisingly demonstrate that only those adducts prepared from the diamines EDA and HDA exhibit a significant amount of degradation in at least one of the trials. The variability in the data between the two trials is not uncommon for such biological testing since it is relatively easy to get a negative result if the biomass health is not optimum. Despite the variability in these data it is evident that those adducts prepared from alkyl glycidyl ethers and diamines are significantly more biodegradable than the corresponding adducts prepared from a polyamine, such as DETA. This result would not be anticipated based on what is known in the literature.

What is claimed is:

1. In a method for controlling the foaming of a waterborne composition which is a protective or decorative coating; an ink composition; an adhesive composition; an overprint vanish; a radiation cured coating, ink, or adhesive composition; an agricultural compositon, or an acid gas scrubbing composition by the incorporation of a foam controlling agent in an amount effective for controlling foam, the improvemnt which comprises utilizing as the foam controlling agent an alkyl glycidyl ether-capped diamine compound of the formula:

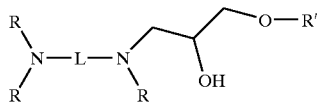

where L is a linker group comprising a linear, branched, or cyclic alkyl group having from 2 to about 6 carbon atoms or an alkyl ether group having from about 4 to about 8 carbon atoms; R is independently selected from hydrogen or —CH$_2$CHOHCH$_2$OR'; and R' is an on alkyl group having from about 4 to about 22 carbon atoms; the compound generating an inital foam height at least 30% less than a 0.1 wt% aqueous solution of dioctyl sodium sulfosuccinate (DOSS), when added at 0.1 wt% to the aqueous DOSS solution.

2. The method of claim 1 in which L is an alkyl group having from 2 to about 5 carbon atoms.

3. The method of claim 1 in which L is an alkyl ether group having from about 4 to about 7 carbon atoms.

4. The method of claim 1 in which R' is an alkyl group having from about 4 to about 20 carbon atoms.

5. The method of claim 1 in which L is —CH$_2$CH$_2$—, R is independently selected from hydrogen or —CH$_2$CHOHCHO—CH$_2$CH$_2$CH$_3$, and R' is a butyl group.

6. The method of claim 1 in which L is —CH$_2$CH$_2$—, R is independently selected from hydrogen or —CH$_2$CHOHCHO—CH$_2$(CH$_2$)$_2$, and R' is an isobutyt group.

7. In a method for controlling the foaming in an industrial process which is an oil well production, acid gas scrubbing, food processing, pulp or paper processing, fermentation, metal treatment, polymer or chemical synthesis, waste-water treatment, or textile dyeing or finishing process employing a waterborne composition by the incorporation of a foam controling agent in an amount effective for controlling foam, the improvement which comprises employing as the foam controlling agent an alkyl glycidyl ether-capped diamnine compound of the formula:

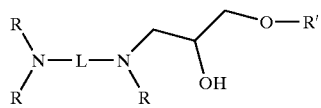

where L is a linker group comprising a linear, branched, or cyclic alkyl group having from 2 to about 6 carbon atoms or an alkyl ether group having from about 4 to about 0 carbon atoms; R is independently selected from hydrogen or —CH$_2$CHOHCH$_2$OR'; and R' is an akyl group haying from about 4 to about 22 carbon atoms; the compound generating an initial foam height at least 30% less than a 0.1 wt% aqueous solution of dioctyl sodium sulfosuccinate (DOSS), when added at 0.1 wt % to the aqueous DOSS solution.

8. The method of claim 7 which ia a process for the removal of hydrogen sulfide and/or carbon dioxide from acid gas-containing gas stream wherein the gas stream is contactod with an aqueous amine solution to adsorb the hydrogen sulfide, the aqueous amine solution is optionally regenerated, and the alkyl glycidyl ether-capped diamine added to control foam.

9. The method of claim 7 in which L is an alkyl group having from 2 to about 5 carbon atoms.

10. The method of claim 7 in which L is an alkyl ether group having from about 4 to about 7 carbon atoms.

11. The method of claim 7 in which R' is an alkyl group having from about 4 about 20 carbon atoms.

12. The method of claim 7 in which L is —CH$_2$CH$_2$—, R is independently selected from hydrogen or —CH$_2$CHOHCHO—CH$_2$CH$_2$CH$_2$CH$_3$, and R' is a butyl group.

13. The method of claim 7 in which L is —CH$_2$CH$_2$—, R is independently selected from hydrogen or —CH$_2$CHOHCHO—CH$_2$CH(CH$_2$)$_3$ and R' is an isobutyl group.

14. An aqueous composition comprising a foam controlling agent, which composition is a protective or decorative coating; an ink composition; an adhesive composition; an overprint varnish; a radiation cured coating, ink, overprint varnish, or adhesive composition: an agricultural composition, or an acid gas scrubbing composition and manifests greater foaming in the absence of the foam controlling agent, wherein the foam controlling agent is an alkyl glycidyl ether-capped diamine foam control agent present in an amount effective for controlling foam and has the formula:

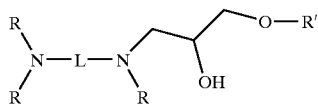

where L is a linker group comprising a linear, branched, or cyclic alkyl group having from 2 to about 6 carbon atoms or an alkyl ether group having from about 4 about 8 carbon atoms; R is —Ch$_2$CHOHCH$_2$OR'; and R' is an alkyl group having from about 4 to about 22 carbon atoms; the compound generating an initial foam height at least 30% less than a 0.1 wt % aqueous solutin of dioctyl sodium mifocuccinate DOSS), when added at 0.1 wt% to the aqueous DOSS solution.

15. The composition of claim 14 in which L is an alkyl group having from 2 to about 5 carbon atoms.

16. The composition of claim 14 in which L is an alkyl ether group having from about 4 to about 7 carbon atoms.

17. The composition of claim 14 in which R' is an alkyl group having from about 4 about 20 carbon atoms.

18. The composition of claim 14 in which L is —CH$_2$CH$_2$—, R is —CH$_2$CHOHCHO—CH$_2$CH$_2$CH$_2$CH$_3$, and R' is a butyl group.

19. The composition of claim 14 in which L is —CH$_2$CH$_2$—, R is —CH$_2$CHOHCHO—CH$_2$CH(CH$_3$)$_2$ and R' is an isobutyl group.

20. The composition of claim 14 which an aqueous coating composition comprising in an aqueous medium 30 to 80 wt % of a coating composition which comprises the following components:
  (a) 0to 50 wt % of a pigment dispersant/grind resin;
  (b) 0to 80 wt % of coloring pigments/extender pigment/ anti-corrosive pigments/other pigment types;
  (c) 5 to 99.9 wt % of water-borne/water-dispersible/water-soluble resins;
  (d) 0 to 30 wt % slip additives/antimicrobials/processing aids;
  (e) 0 to 20 wt % of coalescing or other solvents;
  (f) 0.01 to 10 wt % of surfactant/wetting agent/flow and leveling agents; and
  (g) 0.01 to 5 wt % of an alkyl glycidyl ether-capped diamine foam control agent.

21. The composition of claim 14 which is an aqueous ink composition comprising in an aqueous medium 20 to 60 wt % of an ink composition which comprises the following components:
  (a) 1 to 50 wt % of a pigment;
  (b) 0 to 50 wt % of a pigment dispersant/grind resin;
  (c) 0 to 50 wt % of a clay base in appropriate resin solution vehicle;
  (d) 5 to 99.9 wt % of water-borne/water-dispersible/water-soluble resins;
  (e) 0 to 30 wt % of coalescing solvents;
  (f) 0.01 to 10 wt % of a surfactant/wetting agent;
  (g) 0.01 to 10 wt % of processing aids/solubilizing agents;
  (h) 0.01 to 5 wt % of an alkyl glycidyl ether-capped diamine foam control agent.

22. The composition of claim 14 which is an aqueous agricultural composition comprising in an aqueous medium 0.188 to 80 wt % of an agricultural composition which comprises the following components:
  (a) 0.1–50 wt % of a pesticide or plant growth modifying agent;
  (b) 0 to 5 wt % of a dye;
  (c) 0 to 20 wt % of a thickener/stabilizer/co-surfactant/gel/Inhibitor;
  (d) 0 to 25 wt % of an antifreeze;
  (e) 0.01 to 50 wt % of a surfactant/wetting agent;
  (f) 0.01 to 10 wt % of an alkyl glycidyl ether-capped diamine foam control agent.

23. The composition of claim 14 which is a fountain solution composition comprising the following components:
  (a) 0.05 to 10 wt % of a film formable, water soluble macromolecule;
  (b) 1 to 25 wt % of an alcohol, glycol, or polyol with 2–12 carbon atoms;
  (c) 0.01 to 20 wt % of a water soluble organic acid, inorganic acid, or a salt thereof;
  (d) 30 to 70 wt % of water;
  (e) 0.01 to 5 wt % of a wetting agent; and
  (f) 0.01 to 5 wt % of an alkyl glycidyl ether-capped diamine foam control agent.

24. The composition of claim 14 which is a pressure sensitive adhesive composition comprising the following components:
  (a) 50 to 99 wt % of an acrylic copolymer emulsion or SBR/natural rubber latex;
  (b) 0 to 50 wt % of a tackifier dispersion;
  (c) 0 to 5 wt % of a rheology modifier;
  (d) 0 to 10 wt % of water;
  (e) 0.1 to 5 wt % of a wetting agent;
  (f) 0.1 to 5 wt % of an alkyl glycidyl ether-capped diamine foam control agent.

25. The composition of claim 14 which is an overprint varnish composition comprising the following components
  (a) 20 to 80 wt % of a water-borne/water dispersible resin;
  (b) 0 to 20 wt % of a wax;
  (c) 2 to 50 wt % of water;
  (d) 0 to 20 wt % of a biocide/optical brightener/ crosslinker/scuff and water resistant additive;
  (e) 0 to 20 wt % of a co-solvent;
  (f) 0.01 to 5 wt % of a wetting agent;
  (g) 0.1 to 5 wt % of an alkyl glycidyl ether-capped diamine foam control agent.

26. The composition of claim 14 which is an aqueous acid gas scrubbing composition comprising in water 1 to 500 ppm of an alkyl glycidyl ether-capped diamine foam control agent and 10 to 70 wt % of a second amine.

27. A compound which is ethylenediamine capped with 3 or 4 iso-butyl glycidyl ethers.

* * * * *

UNITED STATES PATENT AND TRADEMARK OFFICE
CERTIFICATE OF CORRECTION

PATENT NO. : 6,746,623 B2
DATED : June 8, 2004
INVENTOR(S) : Caroline Sassano Slone et al.

It is certified that error appears in the above-identified patent and that said Letters Patent is hereby corrected as shown below:

Column 15,
Line 36, delete "vanish" and substitute therefor -- varnish --
Line 67, delete "-$CH_2CHOHCHO-CH_2CH_2CH_3$" and substitute therefor
-- -$CH_2CHOHCHO-CH_2CH_2CH_2CH_3$ --

Column 16,
Line 3, delete "-$CH_2CHOHCHO-CH_2(CH_2)_2$" and substitute therefor -- -$CH_2CHOHCHO$-$CH_2CH(CH_3)_2$ --
Line 3, delete "isobutyt" and substitute therefor -- isobutyl --
Line 14, delete "diamnine" and substitute therefor -- diamine --
Line 26, delete "0 carbon" and substitute therefor -- 8 carbon --
Line 28, delete "haying" and substitute therefor -- having --
Line 33, delete "ia" and substitute therefor -- is --
Line 36, delete "contactod" and substitute therefor -- contacted --
Line 54, delete "-$CH_2CHOHCHO-CH_2CH(CH_2)_3$" and substitute therefor
-- -$CH_2CHOHCHO-CH_2CH(CH_3)_2$ --

Column 17,
Line 8, delete "catbon" and substitute therefor -- carbon --
Line 9, after "4," insert -- to --
Line 10, delete "-$Ch_2CHOHCH_2OR$" and substitute therefor -- $CH_2CHOHCH_2OR'$ --
Lines 13-14, delete "mifocuccinate" and substitute therefor -- sulfosuccinate --
Line 28, after "which," insert -- is --
Lines 32 and 33, delete "0to" and substitute therefor -- 0 to --
Line 33, delete "pigment/" and substitute therefor -- pigments/ --
Line 37, after "%," insert -- of --

Signed and Sealed this

Twenty-third Day of November, 2004

JON W. DUDAS
*Director of the United States Patent and Trademark Office*